United States Patent [19]
Nagano et al.

[11] Patent Number: 5,571,611
[45] Date of Patent: Nov. 5, 1996

[54] COMPOSITE CERAMIC SINTERED MATERIAL AND SLIDER MEMBER USING THE SAME

[75] Inventors: Saburou Nagano; Shuichi Tateno; Kouichi Kamitubo; Kenichi Tajima; Masahito Nakanishi, all of Kokubu, Japan

[73] Assignee: Kyocera Corporation, Kyoto, Japan

[21] Appl. No.: 466,930

[22] Filed: Jun. 6, 1995

Related U.S. Application Data

[62] Division of Ser. No. 162,796, Dec. 7, 1993, Pat. No. 5,462,813, which is a continuation of Ser. No. 828,773, Jan. 30, 1992, abandoned.

[30] Foreign Application Priority Data

| Jan. 31, 1991 | [JP] | Japan | 3-32269 |
| Jan. 31, 1991 | [JP] | Japan | 3-32270 |
| Jan. 31, 1991 | [JP] | Japan | 3-32271 |
| Mar. 25, 1991 | [JP] | Japan | 3-84806 |
| Jun. 27, 1991 | [JP] | Japan | 3-156826 |

[51] Int. Cl.⁶ ........................................ B32B 9/04
[52] U.S. Cl. ............... 428/319.1; 428/310.5; 428/312.6; 428/317.9; 428/318.4; 428/446; 428/447; 428/484; 428/698
[58] Field of Search ............ 428/698, 212, 428/446, 447, 484, 310.5, 312.6, 317.9, 318.4, 319.1

[56] References Cited

U.S. PATENT DOCUMENTS

| 3,911,188 | 10/1975 | Torti, Jr. et al. | 428/212 |
| 4,187,344 | 2/1980 | Fredriksson | 428/446 |
| 4,728,582 | 3/1988 | Comans et al. | 428/699 |
| 4,843,040 | 6/1989 | Oda et al. | 428/698 |

FOREIGN PATENT DOCUMENTS 61-190072  8/1986  Japan.

*Primary Examiner*—Archene Turner
*Attorney, Agent, or Firm*—Loeb & Loeb LLP

[57] ABSTRACT

Disclosed is a composite ceramic sintered material comprising a surface layer of a composition which contains the silicon nitride and carbon, and an internal portion of the silicon carbide or a combination of the silicon carbide, silicon nitride and carbon, the content of carbon or the content of the silicon nitride being greater in the surface layer than in the internal portion.

6 Claims, 4 Drawing Sheets

SURFACE LAYER

SINTERED MATERIAL

500 μm

COMPOSITE CERAMIC SINTERED MATERIAL AND SLIDER MEMBER USING THE SAME

This is a division of application Ser. No. 08/162,796 filed Dec. 7, 1993 now U.S. Pat. No. 5,462,813, which is itself a continuation of application Ser. No. 07/828,773 filed Jan. 30, 1992, and now abandoned.

BACKGROUND OF THE INVENTION

1. Field of the Invention

The present invention relates to a composite ceramic sintered material containing silicon carbide, silicon nitride, free carbon, and the like, and to a process for producing the same. More specifically, the invention relates to a composite sintered material having large strength, toughness and excellent sliding property.

2. Description of the Prior Art

Non-oxide type ceramics as represented by silicon carbide and silicon nitride are now drawing attention as materials having hardness, strength, toughness and chemical stability superior to those of other ceramics and metals, and have already been put into practical us as structural materials and wear-resistant materials, and have further been developed in recent years into structural materials for heat engines such as gas turbines. These ceramics have further ben used as mechanical sealing parts, bearing parts, valve parts for chemicals, etc.

The silicon carbide is obtained by being heated in an inert atmosphere at a temperature of 1800° to 2200° C. by adding a boron-containing compound such as $B_4C$ or carbon as a sintering agent, and study has been forwarded to use it as a structural material for high-temperature applications because of its excellent strength, excellent hardness, excellent abrasion resistance, and very loss of strength at high temperatures.

On the other hand, the silicon nitride is heated in an nitrogen atmosphere at 1600° to 200° C. to increase its density by adding $Al_2O_3$ or oxides of elements of the Group 3a of the periodic table as a sintering agent, since the silicon nitride itself is sintered very difficulty. The silicon nitride exhibits excellent toughness and resistance against thermal shocks though it lacks strength at high temperatures as compared with the silicon carbide.

In an attempt to obtain the silicon nitride and silicon carbide in a composite form, therefore, there has heretofore been proposed as disclosed in, for example, Japanese Laid-Open Patent Publication No. 264364/1985 to join a sintered material of silicon carbide and a sintered material of silicon nitride together, to bake a mixture of the silicon carbide and the silicon nitride, or to form a mixture layer of the silicon nitride and the silicon carbide in at least the surface layer by making metal silicon present in the sintered product of silicon carbide by the reaction sintering method followed by nitriding in an nitrogen atmosphere.

When the sintered materials are to be joined together, however, a suitable joining agent is necessary to join them together. Moreover, the junction portion has a strength which is smaller than the strengths of the sintered materials making it difficult to obtain properties inherent in the respective sintered materials. Even in the case of a simple mixing method, it is difficult to homogeneously disperse them together which therefore is poorly sintered, leaving much room for improvement.

Furthermore, the reaction sintering method has a problem in that it is virtually difficult to completely nitride the metal silicon; i.e., the metal silicon that remains in the sintered material deteriorates the strength. Besides, the surface layer of the obtained sintered material consists of a mixture phase of silicon carbide and silicon nitride, making it difficult to obtain properties inherent in the silicon nitride.

As for applications as slider members, either the silicon nitride alone or the silicon carbide alone does not exhibit sufficient sliding property. Therefore $Al_2O_3$ or an oxide of an element of the Group 3a of periodic table are added as sintering agent to the powder of silicon nitride or to the powder of silicon carbide, or carbon and $B_4C$ or the like are added and, at the same time, a solid lubricant such as graphite or BN is added, and they are heated in vacuum or in an inert atmosphere, in order to homogeneously disperse the solid lubricant in the matrix consisting of the silicon nitride or silicon carbide thereby to enhance slider property on the surface of the sintered material.

The slider property enhances with an increase in the amount of the solid lubricant in the surface layer of the sintered material. However, the solid lubricant that is added in large amounts is detrimental to the density of the sintered material itself and deteriorates the strength of the ceramics itself which is a so-called skeltal material, causing the slider member to be cracked or broken. Therefore, limitation is imposed on the amount of adding solid lubricant.

From the standpoint of production, furthermore, the solid lubricant must be homogeneously dispersed. Depending upon the cases, the solid lubricant in the sintered material becomes a cause of destruction of the sintered material and deteriorates the strength. With the sintered material consisting of the silicon nitride as a matrix and in which a solid lubricant is dispersed, furthermore, a metal oxide that is added as a sintering agent and the exists in the grain boundary of the silicon nitride crystals deteriorates the resistance against chemicals, and the range of application is limited.

SUMMARY OF THE INVENTION

In order to solve the above-mentioned problem, the present inventors have forwarded the study and have discovered the fact that the silicon nitride and carbon can be formed and that the carbon content or the silicon nitride content can be more increased in the surface layer of the sintered material than in the internal portion thereof if a mixture powder consisting chiefly of silicon carbide as a starting material is molded into a desired shape, and if this molded material is directly sintered or is sintered into a porous sintered material followed by heating in a pressurized nitrogen atmosphere to react the silicon carbide with nitrogen.

The inventors have further discovered the fact that if a composition gradient is so formed that a ratio of the silicon carbide to the silicon nitride continuously increases from the surface layer toward the internal portion, properties of the silicon nitride are sufficiently exhibited while retaining the properties of the silicon carbide, making it possible to obtain a sintered material having large toughness, increased resistance against thermal shocks, and excellent strength at high temperatures.

The inventors have further discovered that carbon which exhibits solid lubricating property by itself can be made present in larger amounts in the surface layer of the sintered material than in the internal portion thereof, enabling the surface layer to exhibit increased strength and improved sliding property and, therefore, that the sintered material can be used as various slider members exhibiting highly reliable and stable properties.

According to the present invention, there is provided a composite ceramic sintered material comprising a surface layer of a composition which contains the silicon nitride and carbon, and an internal portion of the silicon carbide or a combination of the silicon carbide, silicon nitride and carbon, the carbon content or the silicon nitride content being larger in the surface layer than in the internal portion.

According to the present invention, furthermore, there is provided a composite ceramic sintered material comprising a composition which contains at least the silicon carbide, the silicon nitride and free carbon, and wherein said silicon carbide has a three-dimensionally bonded porous texture, and the silicon nitride and free carbon with the pores of said porous texture are filled.

According to the present invention, furthermore, there is provided a slider member made of the above composite ceramic sintered material or an oil-containing treated material thereof.

According to an embodiment of the present invention, there is provided a process for producing a composite ceramic sintered material comprising heating a molded material of powder consisting of the silicon carbide as a chief ingredient in a nitrogen atmosphere in order to react the silicon carbide in at least the surface of said molded material with nitrogen, so that the silicon nitride and carbon are formed in at least the surface layer of the molded material.

According to another embodiment of the present invention, there is provided a process for producing a composite ceramic sintered material comprising:

a step for sintering a molded material consisting of the silicon carbide as a chief ingredient in an inert atmosphere to obtain a silicon carbide sintered material having a porous texture; and a step for heat-treating said silicon carbide sintered material in a pressurized nitrogen gas in which the silicon carbide in at least the surface of said sintered material is nitrided, so that the silicon nitride and free carbon are precipitated in the pores of said porous texture.

DETAILED DESCRIPTION OF THE PREFERRED EMBODIMENTS

Composite Ceramic Sintered Material

According to the composite ceramic sintered material of the present invention, a distinguished feature resides in that the surface layer comprises a composition which contains the silicon nitride and carbon, the internal portion comprises the silicon carbide or a combination of the silicon carbide, silicon nitride and carbon, and the carbon content or the silicon nitride content is larger in the surface layer than in the internal portion.

In this specification, the surface layer stands for a portion rich in silicon nitride and carbon in the composite sintered material and, generally, stands for a portion having a thickness from the surface of 10 to 2000 μm and, particularly, 10 to 500 μm. Furthermore, the internal portion stands for the portions of the composite sintered material excluding the above surface layer. In the composite sintered material of the present invention as described above, the surface layer and the internal portion have different chemical compositions but there exists no particular adhesive agent or a bonding agent between them. The composition does not abruptly change between the surface layer and the internal portion but changes maintaining a gradient as determined by the production process which will be described later in detail.

Figure 1:
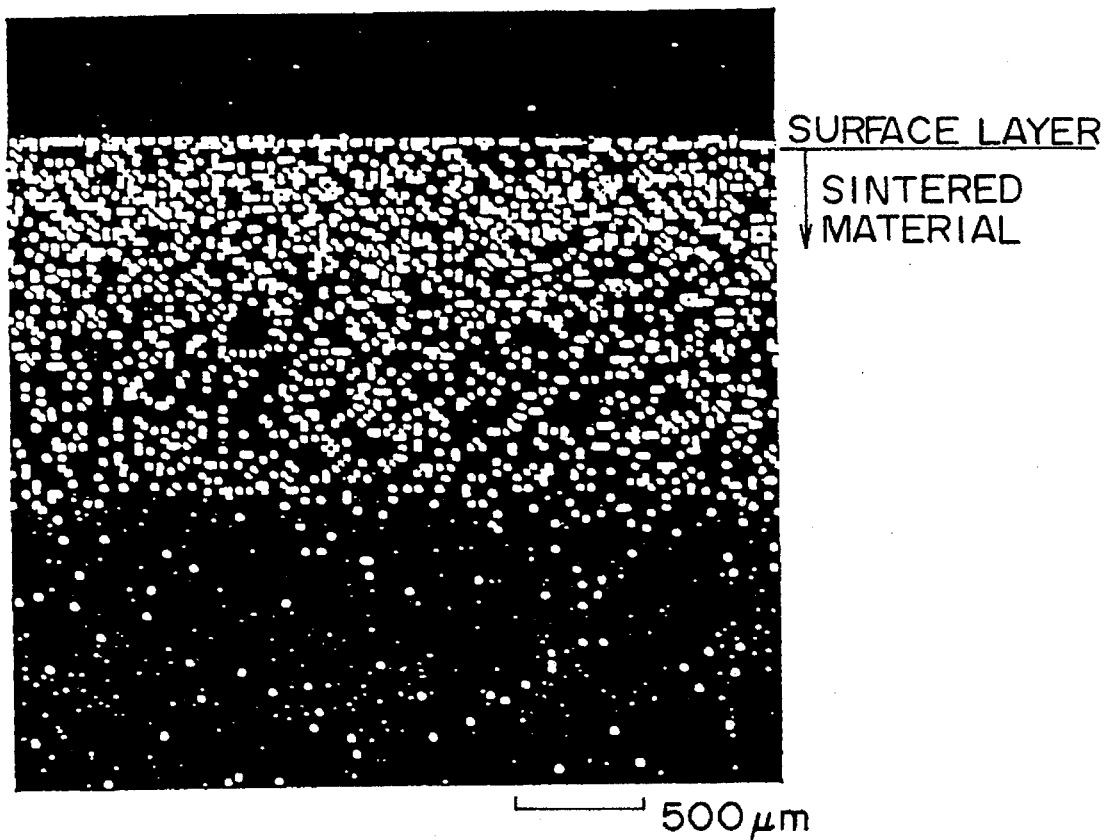
FIG. 1 is a diagram showing in cross section a nitrogen distribution by Electron Probe Micro Analysis (hereinafter referred to as "EPMA" analysis) of a composite ceramic sintered material of the present invention.

Referring to FIG. 1 which is a diagram of nitrogen distribution, nitrogen exists in very large amounts in the surface layer and decreases from the surface layer toward the internal portion, from which it is obvious that the composite sintered material have a composition gradient in which a composition ratio of silicon carbide/(silicon carbide+silicon nitride) increases from the surface layer toward the internal portion.

According to the above constitution, the surface exhibits properties inherent in the silicon nitride, i.e., exhibits excellent toughness while the internal portion exhibits properties inherent in the silicon carbide. In an ordinal silicon nitride sintered material, a metal oxide added as a sintering agent exists as a grain boundary phase among the silicon nitride crystalline particles. In the surface layer of the sintered material of the present invention, however, no metal oxide substantially exists among the silicon nitride crystalline particles making a great feature, and the strength is deteriorated little at high temperatures since there exists no grain boundary phase. Here, it is desired that the composition ratio of silicon carbide/(silicon carbide+silicon nitride) is smaller than 0.1 in the uppermost surface layer. The internal portion chiefly comprises the silicon carbide or the silicon carbide and the silicon nitride, in which the composition ratio of silicon carbide/(silicon carbide+silicon nitride) should desirably be greater than 0.2 in the central portion.

According to the present invention, the surface layer is chiefly comprised of the silicon nitride and the internal portion is chiefly comprised of the silicon carbide or the silicon carbide and the silicon nitride. Therefore, excellent properties of the silicon carbide are exhibited and, in addition, properties of the silicon nitride are exhibited in only the surface layer of the sintered material. Moreover, since the composition of silicon carbide and silicon nitride gradually changes from the surface layer toward the internal portion, generation of stress can be reduced between the surface layer and the internal portion that stems from a difference in the thermal properties between them.

In the sintered material of the present invention, furthermore, a solid lubricant of carbon is dispersed in large amounts in only the surface layer of the sintered material but is dispersed in small amounts in the internal portion in order to improve sliding property of the surface layer without decreasing the strength of the sintered material itself. Therefore, the sintered material can be used as various slider members maintaining high reliability stable properties.

Figure 2:
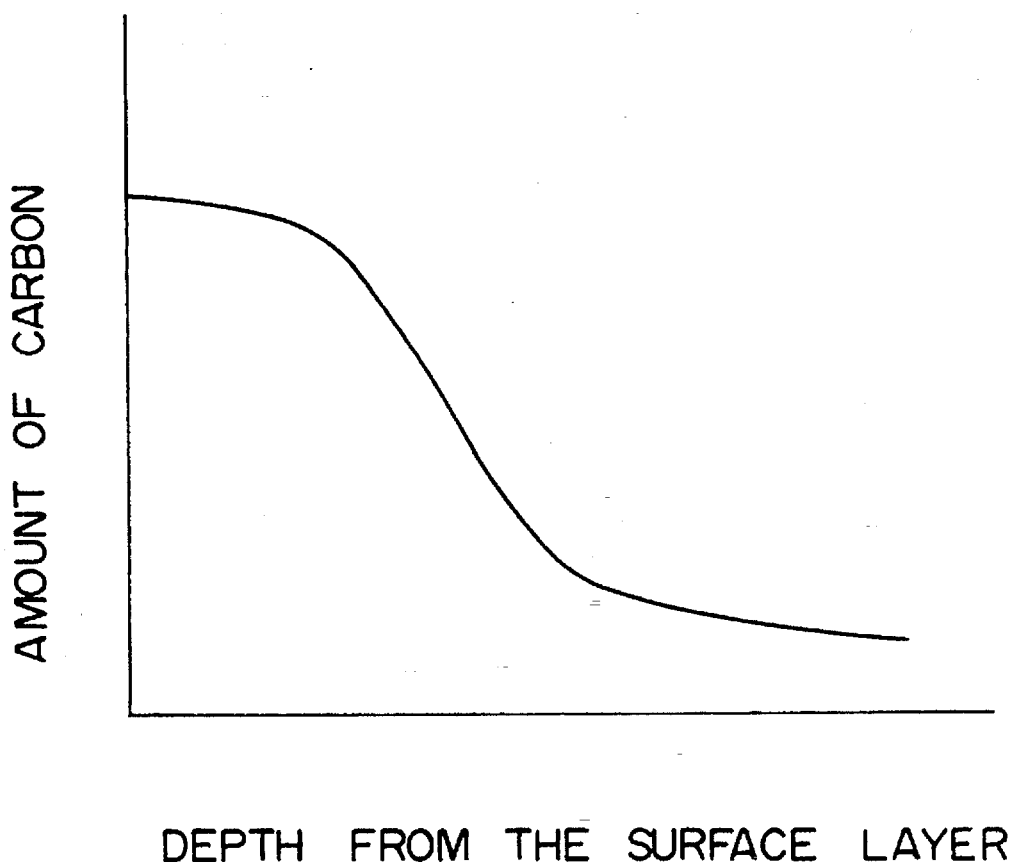
FIG. 2 is a diagram showing a charge in the amount of carbon in the direction of depth from the surface layer of the composite ceramic sintered material of the present invention.

The present invention is based on an idea that the slider property of the ceramic sintered material is dominated by the structure and texture of the surface layer of the sintered material and that the interior of the sintered material serves as a so-called support member for the slider. As shown in FIG. 2, therefore, the solid lubricant of carbon is dispersed in large amounts in the surface layer of the sintered material and is dispersed in decreasing amounts toward the internal portion in order to greatly enhance the slider property.

It is desired that the solid lubricant exists in the surface layer of the sintered material at a volume ratio of about 5 to 30%. When the volume ratio is smaller than 5%, the desired sliding property is not obtained and when the volume ratio is greater than 30%, the strength decreases in the surface layer resulting in the breakage in the slider surfaces.

On the other hand, the internal portion of the sintered material needs not substantially contain the solid lubricant since it does not take part in the slider property and, hence, should be comprised of the silicon carbide and the silicon nitride which are skeltal components.

If the composition or the texture suddenly changes between the surface layer of the sintered material and the internal portion thereof, however, stress builds up due to difference in the properties in the boundary portions resulting in the development of cracks and breakage. It is therefore desired that the amount of the solid lubricant gradually decreases from the surface layer toward the internal portion as shown in FIG. 2.

It is desired that if the surface layer contains carbon in an amount of at least 20% by volume, the surface layer has a thickness of from 10 to 2000 μm. When the thickness is smaller than 10 μm, the slider property is not stably exhibited for long periods of time and when the thickness is greater than 2000 μm, the surface layer loses the strength permitting breakage to develop.

According to the present invention, carbon which is the solid lubricant is made present in large amounts in the surface layer only of the sintered material. Therefore, the sintered material as a whole does not lose the strength and the internal portion maintains a large strength despite carbon exists in relatively large amounts in the surface layer, making it possible to obtain stable slider property when it is used as slider members. Moreover, since the texture changes nearly continuously from the surface layer toward the internal portion, little stress generates from a difference in the properties in the sintered material.

Since carbon is made present in large amounts in the surface layer, it is allowed to enhance the thermal conductivity of the sintered material itself so that the heat generated during the slider operation can be efficiently emitted. Moreover, carbon that is present in suitable amounts in the internal portion helps decrease the electric resistance of the whole sintered material making it possible to carry out the electric discharge machining.

Furthermore, the surface layer that is constituted by the skeltal material of silicon nitride exhibits increased resistance against thermal shocks.

According to a preferred composite sintered material of the present invention, a porous texture of the three-dimensional mesh-like structure is formed by the silicon carbide particles, and the pores among the silicon carbide particles are filled with the silicon nitride and carbon to obtain excellent mechanical strength and slider property. Moreover, carbon is dispersed in the texture in amounts larger in the surface layer of the sintered material than in the internal portion thereof to suppress the amount of the solid lubricant in the internal portion. Therefore, improved slider property is exhibited by the surface layer without losing the strength of the sintered material itself, and the slider members made of the sintered material exhibits improved reliability and stable property.

Figure 3:
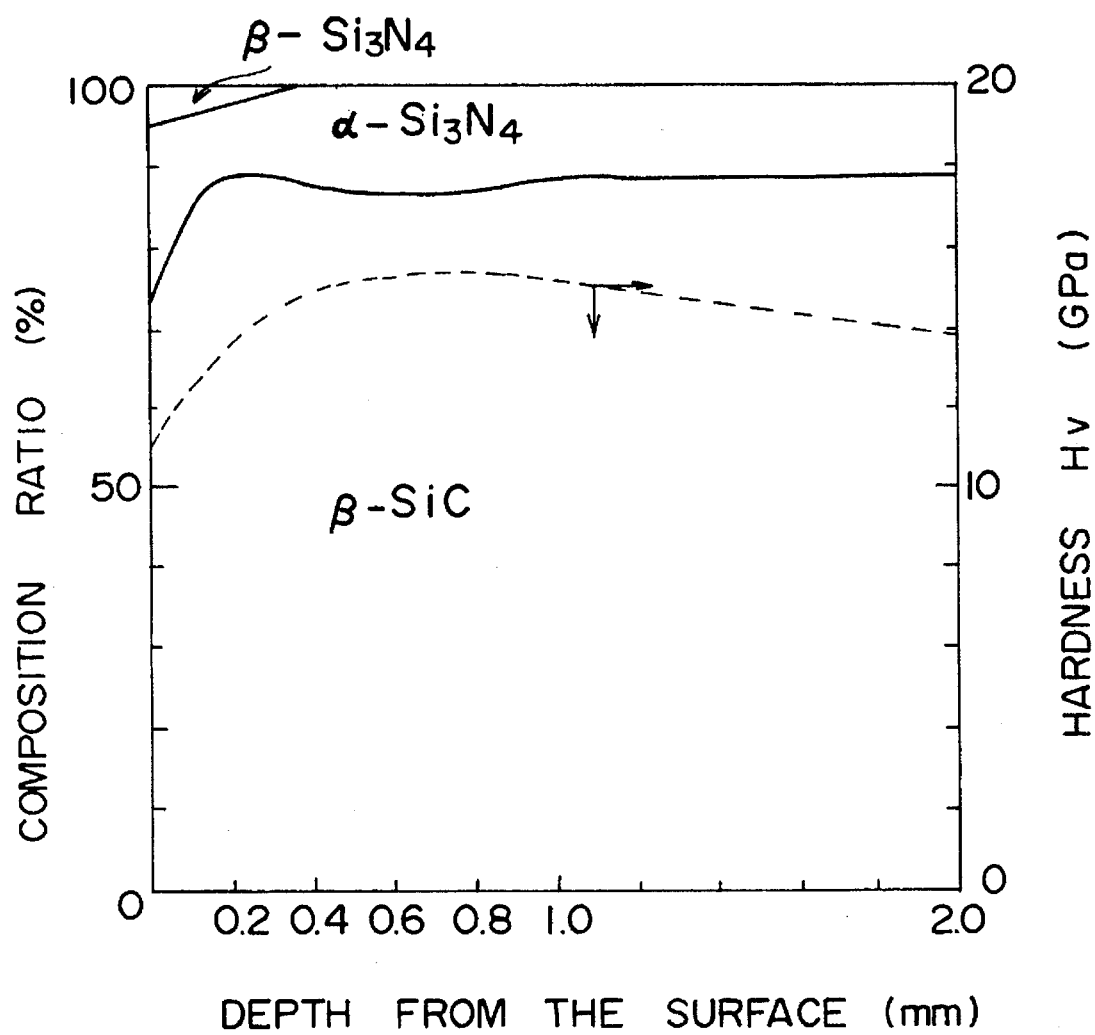
FIG. 3 is a diagram showing silicon carbide and silicon nitride distributions and a hardness distribution in the direction nitride distributions and a hardness distribution in the direction of depth from the surface layer of the composite ceramic sintered material according to Example 5 of the present invention.
Figure 4:
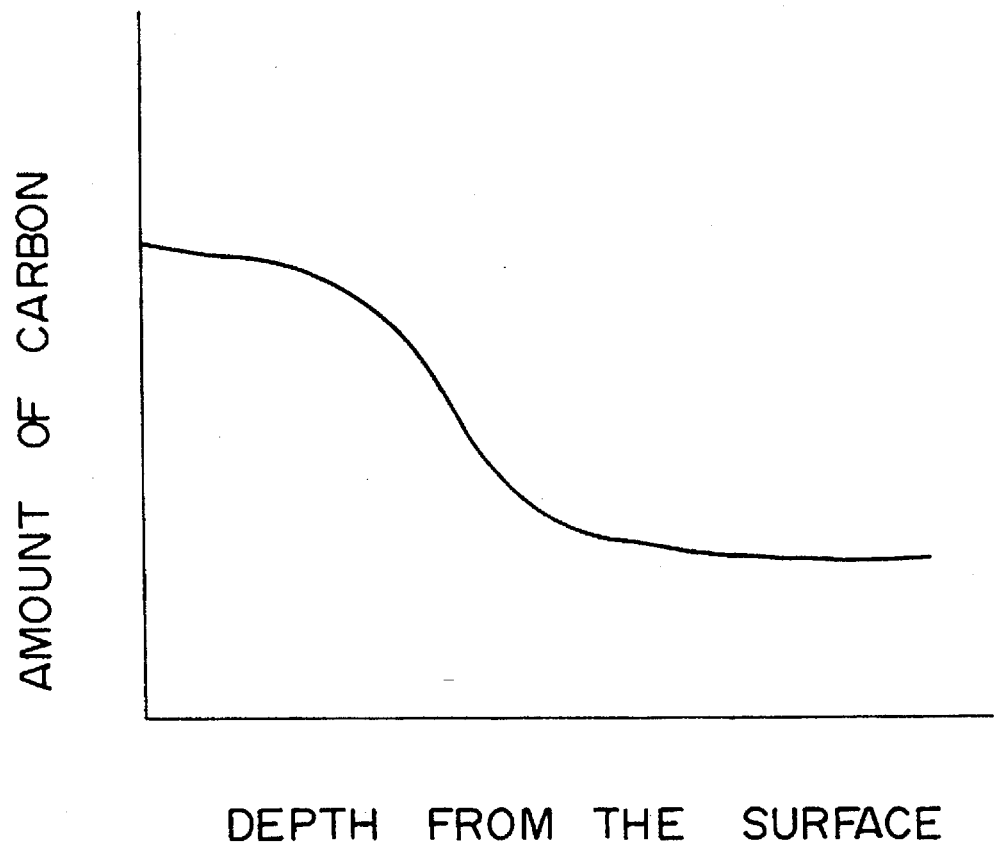
FIG. 4 is a diagram showing a carbon distribution in the direction of depth from the surface layer of the composite ceramic sintered material according to Example 5 of the present invention.

FIG. 3 shows a relationship between the composition ratio (volume ratio) of two components, i.e., silicon carbide and silicon nitride in the composite sintered material of this type and the depth from the surface estimated from the X-ray peak strength ratio, and FIG. 4 shows a relationship between the depth from the surface and the amount of carbon, demonstrating a fact that the silicon nitride and free carbon are formed in the three-dimensional matrix of silicon carbide and that the silicon nitride and carbon exist in considerably amounts in the surface layer. In embodiments of the invention, the $SiC:SiN_4$ ratio may, for example, be 50:50 or 80:20.

In the composite sintered material of this embodiment, the skeltal material for holding the solid lubricant such as carbon has the three-dimensional mesh-like structure made up of the silicon carbide in order to increase the strength of the sintered material as a whole. Moreover, carbon which is the solid lubricant is contained in larger amounts in the surface layer only of the sintered material so that the sintered material as a whole will not lose its strength. Therefore, the internal portion maintains a large strength despite carbon exists in relatively large amounts in the surface layer, and the slider members made of the sintered material exhibits stable slider property. In addition, since the texture changes nearly continuously from the surface layer toward the internal portion, stress is little generated by the difference in properties in the sintered material.

Moreover, since the silicon carbide particles which are the skeltal components are bonded together to form the texture, it is allowed to increase the thermal conductivity of the sintered material itself and to efficiently emit the heat generated during the sliding operation. Carbon that is made present in suitable amounts in the internal portion helps decrease the electric resistance of the whole sintered material, making it possible to carry out the electric discharge machining.

Process for Production

A process for production of the invention will now be described in detail. First, a powder of silicon carbide is prepared as a starting material powder. The powder of silicon carbide to be used is either α-SiC or β-SiC, or both of them being mixed together. The average particle size of the powder of silicon carbide should be from 0.1 to 2 μm. The above powder of silicon carbide may further be blended with additives, i.e., a carbon powder such as of carbon black or graphite, carbonaceous substance such as phenolic resin or coal tar pitch that forms carbon upon thermal decomposition, or a boron-containing compound such as $B_4C$ in an amount of smaller than 10% by weight.

After the above additives are added and mixed sufficiently, the powder of silicon carbide is further mixed with a binder and the like and is molded into any desired shape by a known molding method such as press molding, extrusion molding, cast molding or cold hydrostatic pressure molding. As required, the molded material is calcined at 200° to 800° C., and carbon is formed from a carbon-forming compound such as phenolic resin or the like.

The thus obtained molded material is then heated. According to the present invention, the heating is effected in an atmosphere in which the silicon nitride and carbon can be formed by the reaction of silicon carbide with nitrogen as represented by the following formula,

$$3SiC + 2N_2 \rightarrow Si_3N_4 + 3C \qquad (1)$$

Concretely speaking, the reaction of the above formula (1) is carried out by effecting the heating at a temperature of 1000° to 2200° C. and, particularly, at 1500° to 2200° C. in an atmosphere where a nitrogen gas is contained as an indispensable component, under the nitrogen gas pressure of greater than 500 atms.

The heating makes the internal portion and the surface layer highly dense and particularly makes the above-mentioned reaction active in the surface layer of the sintered material. By adjusting the heating time and the like, therefore, it becomes possible to form a specific sintered material in which carbon and silicon nitride are contained in larger amounts in the surface layer than in the internal portion thereof. By controlling the heating temperature, heating time and the like, it is allowed to increase the amount of carbon and silicon nitride formed in the surface layer and to suppress the amount of carbon silicon nitride formed in the internal portion of the sintered material.

Though the mechanism of sintering has not been clarified, it is presumed that the reaction proceeds in a nitrogen atmosphere of a high temperature and a high pressure in which the surface of the silicon carbide particles are converted into the silicon nitride accompanied by an expansion of the volume. Therefore, the material becomes dense to some extent and once a dense layer is formed on the surface of the sintered material, the nitrogen gas is inhibited from entering into the internal portion of the sintered material. Accordingly, both the surface layer and the internal portion become dense having a porosity of smaller than 10%. The composition, however, changes nearly continuously from the surface layer toward the internal portion.

According to a preferred embodiment of the present invention, a widely known sintering agent such as boron, a boron-containing compound like $B_4C$, an aluminum compound like AlN, carbon or an organic compound that is capable of forming carbon upon calcining, is added to the powder of silicon carbide followed by sufficient mixing and, then, a binder is added to the powder of silicon carbide followed by sufficient mixing and, then, a binder is added to the powder which is then molded into any shape by a known molding method such as press molding, extrusion molding, cast molding or cold hydrostatic pressure molding. The molded material is calcined in an inert atmosphere of argon or in vacuum to obtain a porous material having high porosity. The porous material has a mesh-like structure in which the silicon carbide crystals are three-dimensionally connected.

The heating is effected under the conditions of a temperature of usually 1700° to 2050° C. and particularly 1900° to 2000° C. for 0.2–2.0 hours so that a porous sintered material is obtained in which the silicon carbide is bonded in a three-dimensional manner.

The silicon carbide sintered material should have an open porosity of about 5 to 25%. This is because when the open porosity is smaller than 5%, the silicon nitride and carbon are formed in small amounts and the slider property is not exhibited to a sufficient degree and when the open porosity is greater than 25%, large strength is not exhibited as the skeltal material, the sintered material loses mechanical properties, the pores are not sufficiently filed with the silicon nitride and carbon formed by the reaction represented by the above formula (1), and the remaining pores deteriorate the slider property.

The silicon carbide sintered material is heated in a pressurized nitrogen gas as described above, so that the reaction of the formula (1) proceeds on the surface of the silicon carbide that comes in contact with the nitrogen gas and that the pores of the porous material are filled with the silicon nitride and carbon formed by the reaction enabling the surface to become dense.

In this case, the above reaction becomes active particularly in the surface layer of the sintered material and a particular sintered material is formed in which the reaction products, i.e., carbon and silicon nitride are formed in compliance with the above formula (1) in amounts more in the surface layer than in the internal portion. Therefore, the ratio of amounts of the silicon carbide and silicon nitride which are the skeltal materials changes from the surface layer toward the internal portion, and the composition ratio of silicon carbide/(silicon nitride+silicon carbide) increases from the surface layer toward the internal portion.

Though the mechanism of sintering has not been clarified, it is presumed that the reaction proceeds in a nitrogen atmosphere of a high temperature and a high pressure in which the surfaces of the silicon carbide particles are converted into the silicon nitride accompanied by an expansion of the volume. Therefore, the material becomes dense to some extent and once a dense layer is formed on the surface, the nitrogen gas is inhibited from entering into the internal portion of the sintered material. Accordingly, both the surface layer and the internal portion become dense having a porosity of smaller than 5%. The composition, however changes nearly continuously from the surface layer toward the internal portion.

Applications

According to the present invention, the silicon carbide and silicon nitride can be formed in a composite form by a simple method without using junction method or a like method. Furthermore, large toughness of the silicon nitride can be imparted to the surface layer of the sintered material while retaining excellent properties of the silicon carbide in the internal portion. Therefore, the sintered material finds further broadened applications as structural materials and materials for high-temperature applications.

According to the present invention, furthermore, ceramics is used as a skeltal material and the solid lubricant is made present in larger amounts in the surface layer of the sintered material than in the internal portion thereof to obtain excellent slider property without decreasing the strength of the sintered material as a whole. With carbon that is the solid lubricant being made present in large amounts in the surface layer, furthermore, the sintered material exhibits improved thermal conductivity and electric conductivity, permitting the heat generated by the sliding operation to be efficiently emitted and the electric discharge machining to be carried out.

Furthermore, the skeltal material for holding carbon or a like component that helps improve the slider property is made up of a porous material consisting chiefly of silicon carbide crystals having three-dimensional mesh-like structure, and the solid lubricant such as carbon is held in the pores thereof. Therefore, the composite sintered material exhibits a very small coefficient of friction on the surface yet maintaining large strength, and excellent slider property is obtained when it is used as slider members such as mechanical seals and bearings contributing to extending the life of the materials as well.

According to the present invention, the sintered material having the above-mentioned constitution can be impregnated with a lubricating oil. The sintered material must have an open porosity of a suitable degree so that it can be impregnated with the lubricating oil. Concretely speaking, it is desired that the sintered material has the open porosity of 0.1 to 5%. Examples of the lubricating oil includes a paraffin-type oil, a silicone-type oil, a naphthene-type oil and a fluorine-type oil. The sintered material should be impregnated with the oil in an amount of 0.01 to 1% by weight.

The sintered material is impregnated with the oil by immersing it in a bath of the lubricating oil, leaving it in vacuum under the condition where the oil is heated at a temperature of about 80° to 120° C. to decrease its viscosity in order to defoam the sintered material and, then, taking the sintered material out from the bath of the lubricating oil. Pores of the sintered material are filled with the lubricating oil.

EXAMPLES

The invention will now be described by way of the following examples.

Example 1

To a β-SiC powder (average particle size of 0.4 μm, oxygen content of 0.2% by weight) were added a suitable amount of a 20% resol-type phenolic resin solution as a molding binder and a suitable amount of acetone as a solvent. The powder was kneaded, dried, and was passed through a sieve to obtain granules for molding. Using a metal mold press, the granules were molded into disc-like molded materials 20 mm in outer diameter and 10 mm in thickness.

The molded materials were then calcined in an inert atmosphere ($N_2$ stream) at 600° C. to carbonize the phenolic resin, and the composition of the calcined materials was analyzed. The calcined materials were heated under conditions of $N_2$ pressures, heating temperatures and heating times that are shown in Table 1.

The obtained sintered materials were measured for their open porosities and densities by the Archimedes' method, the surface layers of the sintered materials were analyzed by the X-ray diffraction method, and the sintered materials were pulverized to analyze the composition of the sintered materials by the powder X-ray diffraction. Further, samples were cut out from the sintered materials and the distributions of nitrogen atoms on the cut surfaces were inspected by the EPMA analysis as shown in FIG. 1. The results were as shown in Table 2.

To evaluate the mechanical properties, the flat surfaces of the sintered materials were polished by 100 um and the mirror surfaces thereof were measured for their toughness (Klc) by the indentation method (IF method). Niibara's formula was used for the calculation.

As a comparative example, a molded material was prepared in the same manner as the above-mentioned method with the exception of adding a $B_4C$ powder in an amount of 0.4 parts by weight to 100 parts by weight of the β-SiC powder (average particle size of 0.4 μm). Thereafter, the molded material was heated in an argon atmosphere of 1 atm at 2050° C. for one hour to obtain a dense silicon carbide sintered material (sample No. 1 in Table) which was then measured for its properties and was evaluated in the same manner as above.

TABLE 1

| Sample No. | Recipe Powder | Recipe Binder | Composition of calcined material (% by weight) SiC | Carbon | Others | Heating temp. (°C.) | $N_2$ pressure (atm) | Reation Time (Hr) |
|---|---|---|---|---|---|---|---|---|
| *1 | β-SiC, $B_4C$ | phenolic resin | 97.7 | 1.9 | $B_4C$ 0.4 | 2050 | (Ar) 1 | 1 |
| 2 | β-SiC | phenolic resin | 98.4 | 1.96 | — | 1800 | 2000 | 1 |
| 3 | α-SiC | polyvinyl alcohol | 100 | — | — | 1900 | 2000 | 0.5 |
| 4 | β-SiC, $B_4C$ | phenolic resin | 97.7 | 1.9 | $B_4C$ 0.4 | 1800 | 2000 | 0.5 |
| 5 | β-SiC, $B_4C$ | phenolic resin | 97.7 | 1.9 | $B_4C$ 0.4 | 1800 | 2000 | 1 |
| *6 | β-SiC, $B_4C$ | phenolic resin | 97.7 | 1.9 | $B_4C$ 0.4 | 2000 | 10 | 3 |
| *7 | β-SiC, $B_4C$ | phenolic resin | 97.7 | 1.9 | $B_4C$ 0.4 | 1300 | 1000 | 1 |

A mark * indicates samples that are not included in the scope of the present invention.

TABLE 2

| Sample No. | Constituent phases Surface layer | Constituent phases Internal portion | SC/SN + SC Surface layer | SC/SN + SC Internal Portion | Porosity % | Density (g/cm$^3$) | KIc MPa · m$^{1/2}$ | Strength (Kg/mm$^2$) |
|---|---|---|---|---|---|---|---|---|
| *1 | β-SiC | β-SiC | 1 | 1 | 0.3 | 3.10 | 3.1 | 45 |
| 2 | α, β-$Si_3N_4$ C | α, β-$Si_3N_4$ β-SiC, C | 0 | 0.3 | 0.1 | 2.72 | 3.8 | 55 |
| 3 | β-$Si_3N_4$ C | α, β-$SiN_4$ β-SiC, C | 0 | 0.2 | 0.1 | 2.76 | 4.2 | 57 |
| 4 | α, β-$Si_3N_4$ | α, β-$Si_3N_4$ | 0 | 0.3 | 0.2 | 2.71 | 4.0 | 53 |

TABLE 2-continued

| Sample No. | Constituent phases | | SC/SN + SC | | Porosity % | Density (g/cm³) | KIc MPa·m^(1/2) | Strength (Kg/mm²) |
|---|---|---|---|---|---|---|---|---|
| | Surface layer | Internal portion | Surface layer | Internal Portion | | | | |
| 5 | C α, β-Si₃N₄ β-SiC, C | β-SiC, C α, β-Si₃N₄ β-SiC, C | 0.1 | 0.7 | 1.7 | 2.70 | 4.3 | 42 |
| *6 | β-SiC | β-SiC | 1 | 1 | not densely formed | 2.02 | — | — |
| *7 | β-SiC | β-SiC | 1 | 1 | not densely formed | 1.94 | — | — |

A mark * indicates samples which are not included in the scope of the present invention.

Example 2

To 100 parts by weight of the β-SiC powder (average particle size of 0.4 μm, oxygen content of 0.2% by weight) were added 10 parts by weight of the 20% resol-type phenolic resin solution as a molding binder and a suitable amount of acetone as a solvent. The powder was kneaded, dried, and was passed through a sieve to obtain granules for molding. Using the metal mold press, the granules were molded under a molding pressure of 2000 kg/cm² to obtain disc-like molded materials 20 mm in outer diameter and 10 mm in thickness.

The molded materials were than calcined in an inert atmosphere (N₂ stream) to 600° C. to carbonize the phenolic resin, and the composition of the calcined materials were analyzed, SiC, 98.1% by weight, carbon, 1.96% by weight.

The calcined materials were heated by changing the heating temperature and the pressure.

The obtained sintered matereials were measured for their open porosities by the Archimedes' method, and the constituent phases of the surface layere and internal portion of the sintered materials were analyzed by the X-ray diffraction analysis. The surface layers were cut out from the samples pulverized, and were then measured for their total amount of carbon, total amount of nitrogen and total amount of silicon by the LECO method and measured the total amount of silicon by inductively coupled plasma admic mission spectors copy. Nitrogen was found as the silicon nitride, bonded carbon was found on the basis that the remaining silicon exists as the silicon carbide, and remaining carbon was calculated as free carbon. At the same time, the constituent phases were examined by the powder X-ray diffraction method. The results were as shown in Table 3.

TABLE 3

| Sample No. | Heating condition | | Porosity (%) | Constituent Phases | | Amount of carbon in surface layer (% by vol.) |
|---|---|---|---|---|---|---|
| | Temp. (°C.) | Pressure (atm) | | Surface layer | Internal portion | |
| 1 | 2100 | 2000 | 0.1 | β-SN, C | β-SN, β-SC, C | 28 |
| 2 | 1900 | 2000 | 0.1 | β-SN, C | α, β-SN, β-SC, C | 28 |
| 3 | 1700 | 2000 | 0.8 | α, β-SN, C | α, β-SN, β-SC, C | 26 |
| *4 | 900 | 2000 | 30 | β-SC | β-SC | — |
| 5 | 1900 | 1000 | 2 | β-SN, C β-SC | α, β-SN, β-SC, C | 15 |
| 6 | 1900 | 500 | 8 | β-SN, C β-SC | α, β-SN, β-SC, C | 7 |
| *7 | 1900 | 100 | 25 | β-SC | β-SC | — |

A mark * indicates samples that are not included in the scope of the present invention, SN represents Si₃N₄ and SC represents SiC.

In the case of the samples Nos. 4 to 7 that were treated at a temperature lower than 1000° C. or under a nitrogen pressure lower than 500 atms. as is obvious from Table 3, the silicon carbide was not converted into the silicon nitride and no carbon formation was recognized.

Sintered materials were further prepared quite in the same manner as the above method with the exception of using the starting material, changing the composition of the calcined materials into ratios as shown in Table 4, and effecting the heating under the conditions of a temperature of 1900° C., a nitrogen gas pressure of 2000 atm. for one hour.

The obtained sintered materials were evaluated for their properties in the same way as described above. To evaluate the mechanical properties, furthermore the four-point bending transverse breaking test was carried out in compliance with JISR 1601. As shown in Table 4, formation of carbon was recognized in the surface layer of all sintered materials, the porosity was smaller than 1% and the strength was greater than 20 kg/mm².

TABLE 4

| Sample No. | Composition of calcined materials (% by weight) | | | Porosity (%) | Constituent Phases | | Amount of carbon in surface layer (% by Vol.) | Strength (kg/mm$^2$) |
|---|---|---|---|---|---|---|---|---|
| | SiC | Carbon | Others | | Surface layer | Internal portion | | |
| 8 | 100 | — | — | 0.2 | β-SN, C | α, β-SN, β-SC, C | 26 | 53 |
| 9 | 95 | 5 | — | 0.5 | β-SN, C | α, β-SN, β-SC, C | 29 | 38 |
| 10 | 95 | — | B$_4$C 5 | 0.3 | β-SN, C, BN | α, β-SN, β-SC, C, BN | 23 | 40 |
| 11 | 95 | — | BN 5 | 1.0 | β-SN, C, BN | α, β-SN, β-SC, C, BN | 22 | 35 |
| 12 | 95 | 2 | B$_4$C 3 | 0.8 | β-SN, C, BN | α, β-SN, β-SC, C, BN | 23 | 42 |

SN represents Si$_3$N$_4$ and SC represents SiC.

Example 3

To the β-SiC powder (average particle size of 0.4 μm, oxygen content of 0.1% by weight) were added a suitable amount of the 20% resol-type phenolic resin solution as a molding binder and a suitable amount of acetone as a solvent. The powder was kneaded, dried, and was passed through a sieve to obtain granules for molding. Using the metal mold press, the granules were molded under the molding pressure of 2000 kg/cm$^2$ to obtain disc-like molded materials 20 mm in outer diameter and 10 mm in thickness.

Next, the molded materials were calcined in an inert atmosphere (N$_2$ stream) to 600° C. to carbonize the phenolic resin and, then, the composition of the calcined materials was analyzed. The calcined material were then heated under the conditions of N$_2$ prssures, heating temperatures and heating times shown in Table 5.

The obtained sintered materials were measured for their open porosities densities by the Archimedes' method, and the surface layer were cut out from the internal portion of th sintered materials, pulverized, and were measured for their total amount of carbon, total amount of nitrogen by the LECO method and measured the total amount of silicon by inductively coupled plasma admic mission spectors copy. Nitrogen was calculated as silicon nitride, bonded carbon was found on the basis that the remaining silicon exists as silicon carbide, and the remainder was calculated as free carbon. Further, the constituent phases of the skeltal material were analyzed by the X-ray analysis. In the samples to which B$_4$C was added as an additive, B$_4$C was nitrided into BN. However, it was not detected by the X-ray diffraction measurement since the amount added was very small. The results were as shown in Table 6.

To evaluate the properties, the four-point bending strength was measured in compliance with JISR 1601. Using transverse breaking test pieces, furthermore, the volume resistivity was measured by the four-terminal method. In order to test the resistance against chemicals, furthermore, cubic samples having a side of 8 mm were cut out and were immersed in a 20% solution of hydrochloride acid, a 60% solution of nitric acid, and a 90% solution of sulfuric acid for three days in order to observe their conditions.

In order to evaluate the slider property, furthermore, an SUJ II steel ball was brought as a fixed pin into contact with a disk of a diameter of 50 mm having a lapped surface, and the sample disc was rotated to measured the contact load and the frictional force thereby to find a friction of coefficient.

As a comparative example, a molded material was prepared in the same manner as the above-mentioned method with the exception of adding a B$_4$C powder in an amount of 0.4 parts by weight to 100 parts by weight of the β-SiC powder (average particle size of 0.4 μm). Thereafter, the molded material was heated in an argon atmosphere at 2050° C. for one hour to obtain a dense silicon carbide sintered material (sample No. 1 in Table) which was then measured for its properties and was evaluated in the same manner as above. The results were as shown in Table 7.

With the conventional sintered materials of silicon carbide as shown in Table 5 to 7, the coefficients of friction which stands for the slider property were from 0.4 to 0.5. With the sintered materials of the present invention, on the other hand, the coefficients of friction were all of the level of 0.2 to 0.3 and the strengths were greater than 40 kg/mm$^2$.

TABLE 5

| Sample No. | Recipe powder | Composition of calcined material (% by weight) | | | Heating temp. (°C.) | N$_2$ pressure (atm) | Heating time (Hr) |
|---|---|---|---|---|---|---|---|
| | | SiC | Carbon | Others | | | |
| *1 | β-SiC, B$_4$C | 97.7 | 1.9 | B$_4$C 0.4 | 2050 | 1 | 1 |
| 2 | β-SiC | 98.4 | 1.96 | — | 1800 | 2000 | 1 |
| 3 | α-SiC | 100 | — | — | 1900 | 2000 | 0.5 |
| 4 | β-SiC, B$_4$C | 97.7 | 1.9 | B$_4$C 0.4 | 1800 | 2000 | 0.5 |
| 5 | β-SiC, B$_4$C | 97.7 | 1.9 | B$_4$C 0.4 | 1500 | 1800 | 4 |
| *6 | β-SiC, B$_4$C | 97.7 | 1.9 | B$_4$C 0.4 | 1500 | 100 | 1 |
| *7 | β-SiC, B$_4$C | 97.7 | 1.9 | B$_4$C 0.4 | 900 | 2000 | 1 |

A mark * indicates samples that are not included in the scope of the present invention.

TABLE 6

| Sample No. | Constituent phases of skeltal material | | Amount of carbon (% by vol.) | | Thickness of surface layer (μm) | Porosity (%) |
|---|---|---|---|---|---|---|
| | Surface layer | Internal portion | Surface layer | Internal portion | | |
| *1 | β-SiC | β-SiC | — | — | — | 0.3 |
| 2 | α, β-Si$_3$N$_4$, C | α, β-Si$_3$N$_4$, β-SiC, C | 28 | 12 | 1700 | 0.1 |
| 3 | β-Si$_3$N$_4$, C | α, β-Si$_3$N$_4$, β-SiC, C | 28 | 10 | 1800 | 0.1 |
| 4 | α, β-Si$_3$N$_4$, C | α, β-Si$_3$N$_4$, β-SiC, C | 16 | 9 | 1000 | 0.8 |
| 5 | α, β-Si$_3$N$_4$, | β-SiC, C, α-Si$_3$N$_4$ | 10 | 7 | 20 | 2 |
| *6 | β-SiC | β-SiC | — | — | — | 25 |
| *7 | β-SiC | β-SiC | — | — | — | 20 |

A mark * indicates samples that are not included in the scope of the present invention.

TABLE 7

| Sample No. | Density (g/cm$^2$) | KIc (MPa · m$^{1/2}$) | Strength (kg/mm$^2$) | Volume resistivity (Ω-cm) | Resistance against chemicals | Coefficient of friction |
|---|---|---|---|---|---|---|
| *1 | 3.12 | 3.1 | 45 | 6 × 10$^4$ | no change | 0.4–0.5 |
| 2 | 2.72 | 3.8 | 43 | 4 × 10$^{-2}$ | no change | 0.1–0.2 |
| 3 | 2.70 | 4.2 | 55 | 5 × 10$^{-2}$ | no change | 0.1–0.2 |
| 4 | 2.71 | 4.5 | 52 | 6 × 10$^{-2}$ | no change | 0.2–0.25 |
| 5 | 2.93 | 4.8 | 48 | 3 × 10$^0$ | no change | 0.2–0.3 |
| *6 | — | — | — | — | — | — |
| *7 | — | — | — | — | — | — |

A mark * indicates samples that are not included in the scope of the present invention.

Example 4

To the β-SiC powder (average particle size of 0.4 μm, oxygen content of 0.1% by weight) were added various kinds of additives depending upon the cases as shown in Table 1, a suitable amount of the 20% resol-type phenolic resin solution as a molding binder, and a suitable amount of acetone as a solvent. The powder was kneaded, dried, and was passed through a sieve to obtain granules for molding. Using the metal mold press, the granules were molded under the molding pressure of 2000 kg/cm$^2$ to prepare disc-like molded materials 20 mm in outer diameter and 10 mm in thickness. The molded materials were then calcined in an inert atmosphere (N$_2$ stream) at 600° C. to carbonize the phenolic resin, and the composition of the calcined materials was analyzed. The calcined material were heated under the conditions of Table 8 to obtain samples Nos. 1 to 6.

The obtained sintered materials were measured for their open porosities by the Archimedes' method. Further, the transverse breaking strength was measured in compliance with JISR 1601. The surface layers were cut out from the internal portion of the sintered material, pulverized, and were measured for their total amount of carbon and total amount of nitrogen by the LECO method. Nitrogen was calculated as silicon nitride, bonded carbon was found on the basis that the remaining silicon exists as silicon carbide, and the remainder was calculated as free carbon. Further, the constituent phases of sintered materials were analyzed by the X-ray analysis. In the samples to which B$_4$C was added as an additive, B$_4$C was nitrided into BN. However, it was not detected by the X-ray diffraction measurement since the amount added was very small.

The obtained sintered matereial were polished into discs measuring 50 mm in diameter and 10 mm in thickness and, after the surfaces were lapped, were washed, dried, and were immersed in a bath of a general-purpose lubricating oil that consisted of a paraffin-type based oil having a very low pour point, and were then heated in a reduced-pressure (20 mmTorr) container at 110° C. for one hour. The amounts of oil with which the samples were impregnated were found based on changes in the weight before and after the impregnation.

Next, the SUJ II steel ball was brought as a fixed pin into contact with the sample discs and the sliding property was evaluated by the ball-on-disc method by rotating the sample disc. The contact load and the frictional force were measured to calculate coefficients of friction. The results were as shown in Table 9.

With the slider member (sample No. 4) made of the conventional SiC sintered material as shown in Tables 8 and 9, the coefficient of friction was about 0.6 whereas with the slider members of the present invention, the coefficients of friction were as excellent as about 0.1. Excellent slider property was exhibited even as compared with the samples of comparative examples that were not impregnated with the lubricating oil.

TABLE 8

| Sample No. | Composition of calcined material | | | Heating temp. (°C.) | × | $N_2$ pressure (atm) | × | Time (hr) | Skeltal material constitution | |
|---|---|---|---|---|---|---|---|---|---|---|
| | SiC | Carbon | Others | | | | | | Surface layer | Internal portion |
| 1 | 97.7 | 1.9 | $B_4C$ 0.4 | 1800 | × | 2000 | × | 0.5 | α, β-$Si_3N_4$, C | α, β-$Si_3N_4$, β-SiC, C |
| *2 | 97.7 | 1.9 | $B_4C$ 0.4 | 1800 | × | 2000 | × | 0.5 | α, β-$Si_3N_4$, C | α, β-$Si_3N_4$, β-SiC, C |
| 3 | 98.0 | 2.0 | — | 1700 | × | 1800 | × | 2 | α, β-$Si_3N_4$, C | α, β-$Si_3N_4$, β-SiC, C |
| *4 | 97.7 | 1.9 | $B_4C$ 0.4 | 2050 | × | 1 | × | 1 | β-SiC | β-SiC |
| 5 | 98.0 | 2.0 | — | 1800 | × | 1900 | × | 1 | α, β-$Si_3N_4$, C | α, β-$Si_3N_4$, β-SiC, C |
| *6 | 98.0 | 2.0 | — | 1800 | × | 1900 | × | 1 | β-$Si_3N_4$, C | α, β-$Si_3N_4$, β-SiC, C |

A mark * indicates samples that are not included in the scope of the present invention.

TABLE 9

| Sample No. | Amount of carbon (% by vol.) | | Open porosity (%) | Transverse breaking strength (kg/mm²) | Impregnated oil (% by wt.) | Coefficient of friction (μ) |
|---|---|---|---|---|---|---|
| | surface layer | internal portion | | | | |
| 1 | 26 | 9 | 0.8 | 52 | 0.2 | 0.1 |
| *2 | 26 | 9 | 0.8 | 52 | — | 0.25 |
| 3 | 15 | 8 | 2.0 | 40 | 0.3 | 0.1 |
| *4 | — | — | 0.3 | 45 | — | 0.6 |
| 5 | 26 | 10 | 0.2 | 40 | 0.1 | 0.1 |
| *6 | 26 | 10 | 0.2 | 40 | — | 0.3 |

A mark * indicates samples that are not included in the scope of the invention.

Example 5

To the β-SiC powder (average particle size of 0.4 μm, oxygen content of 0.1% by weight) were added a suitable amount of the 20% resol-type phenolic resin solution as a molding binder and a suitable amount of acetone as a solvent. The powder was kneaded, dried, and was passed through a sieve to obtain granules for molding. Using the metal mold press, the granules were molded under the molding pressure of 2000 kg/cm² to prepare disc-like molded materials 60 mm in outer diameter and 10 mm in thickness.

The molded materials were formed into a predetermined shape and were heated in an inert atmosphere (argon stream) at 2000° C. for one hour. The sintered materials were heated under the conditions of $N_2$ pressures, heating temperatures and heating times shown in Table 10.

The obtained sintered materials were measured for their densities and porosities by the Archimedes' method, and the constituent phase of the surface layer was analyzed by the X-ray diffraction measurement. Moreover, the heated surface was ground by 0.2 mm to evaluate the slider property of the surface. The SUJ II steel ball was brought as a fixed pin into contact with the disc 50 mm in diameter having a lapped surface, and the sample disc was rotated to measure the contact load and the frictional force to find the coefficient of friction from which the slider property was evaluated. After the test, the surface of the sample was measured for its Vickers' hardness. Further, the texture of the obtained sintered material was observed through an electron microscope to make sure the presence or absence of three-dimensional mesh-like structure. The strength of the sintered material was measured in compliance with JISR 1601. The results were as shown in Table 11.

As a comparative example, a molded material was prepared quite in the same manner as the above method with the exception of adding a $B_4C$ powder in an amount of 0.4 parts by weight to 100 parts by weight of the β-SiC powder (average particle size of 0.4 μm), followed by heating in vacuum at 2050° C. for one hour to obtain a dense silicon carbide sintered material which was measured for its properties and evaluated for its slider property in the same manner as above (sample No. 1 in Table).

Furthermore, the sample No. 3 was measured for its composition distribution from the surface toward the internal portion thereof. FIG. 3 shows the composition distribution and hardness distribution of silicon carbide and silicon nitride and FIG. 4 shows a change in the amount of carbon.

TABLE 10

| Sample No. | Composition of molded material (% by wt.) | | Sintering condition | | | Density of sintered material (g/cm³) | Nitriding condition | | | | | |
|---|---|---|---|---|---|---|---|---|---|---|---|---|
| | | | Temp. (°C.) | × | Time (hr) (gas) | | N₂ pressure (atm) | × | Temp. (°C.) | × | Time (hr) | |
| *1 | β-SiC 100 | B₄C 0.5 C 2.0 | 2100 | × | 0.5 Ar | 3.10 | 2000 | × | 1800 | × | 1 | |
| 2 | β-SiC 100 | B₄C 0.5 C 2.0 | 1900 | × | 1 Ar | 2.31 | 2000 | × | 1800 | × | 1 | |
| 3 | β-SiC 100 | B₄C 0.5 C 2.0 | 2000 | × | 1 Ar | 2.68 | 2000 | × | 1800 | × | 1 | |
| 4 | α-SiC 100 | B₄C 0.5 C 4.0 | 2050 | × | 1 Ar | 2.87 | 2000 | × | 1800 | × | 1 | |
| 5 | β-SiC 100 | B₄C 5.0 C 2.0 | 2000 | × | 1 Ar | 2.63 | 2000 | × | 1800 | × | 1 | |
| 6 | β-SiC 100 | B₄C 0.5 C 2.0 | 2000 | × | 1 Ar | 2.65 | 90 | × | 1800 | × | 4 | |
| 7 | α-SiC 100 | AlN 2.0 C 2.0 | 2050 | × | 1 Ar | 2.54 | 90 | × | 1800 | × | 1 | |
| 8 | β-SiC 100 | B₄C 0.5 C 2.0 | 2000 | × | 1 Ar | 2.68 | — | | | | | |
| 9 | β-SiC 100 | AlB₂ 1.0 C 2.0 | 1950 | × | 1 Ar | 2.48 | 1000 | × | 1600 | × | 6 | |
| 10 | β-SiC 100 | Al₂O₃ 4.0 Y₂O₃ 1.0 | 1700 | × | 1 N₂ | 2.52 | 2000 | × | 1800 | × | 1 | |
| 11 | β-SiC 100 | B₄C 0.5 C 2.0 | — | | | — | 2000 | × | 1800 | × | 1 | |

A mark * indicates samples that are not includd in the scope of the present invention.

TABLE 11

| | Properties of sintered material | | | Surface hardness (GPa) | Co-efficient of friction | 3-D mesh struc-ture | Strength (kg/mm²) |
|---|---|---|---|---|---|---|---|
| Sample No. | Density (g/cm³) | porosity (%) | Surface constituent phases | | | | |
| *1 | — | 0.5 | β-SiC | 23 | 0.6 | no | 48 |
| 2 | 2.76 | 0.5 | β-SiC, C, α/β-SiN₄ | 10 | 0.1 | yes | 45 |
| 3 | 2.94 | 0.7 | " | 16 | 0.08 | yes | 53 |
| 4 | 3.02 | 0.2 | " | 18 | 0.1 | yes | 55 |
| 5 | 2.81 | 1.3 | β-SiC, C, BN, α/β-SN | 16 | 0.05 | yes | 40 |
| 6 | 2.91 | 0.8 | " | 14 | 0.07 | yes | 43 |
| 7 | 2.83 | 0.6 | " | 12 | 0.1 | yes | 48 |
| 8 | — | 10 | β-SiC | — | — | yes | 17 |
| 9 | 2.78 | 2.8 | β-SiC, C, α/β-SN | 11 | 0.2 | yes | 40 |
| 10 | 2.78 | 1.1 | β-SiC, C, β-SN, Si₂ON₂ | 10 | 0.2 | yes | 48 |
| 11 | 2.69 | 5.0 | β-SiC, C, α/β-SN | 6 | 0.4 | no | 35 |

A mark * indicates samples that are not included in the scope of the present invention.

With the conventional sintered material of silicon carbide as shown in Tables 10 and 11, the coefficients of friction which stands for the slider property were from 0.4 to 0.5. With the sintered materials of the present invention, on the other hand, the coefficients of friction were all of the level of 0.2 or smaller and the transverse breaking strengths were measured to be greater than 40 kg/mm².

From FIGS. 3 and 4, furthermore, it is understood that carbon and silicon nitride exist in larger amounts in the surface layer of the sintered material than in the internal portion thereof. Furthermore, the distribution of hardness indicates that the surface layer of the sintered material has a hardness that is slightly lower than that of the internal portion and the hardness becomes the greatest about 0.5 mm deep from the surface.

We claim:

1. A slider member comprising a composite ceramic sintered material comprising a surface layer of a composition which contains silicon nitride and carbon, and an internal portion of silicon carbide or a combination of silicon carbide, silicon nitride and carbon, the content of carbon or of silicon nitride being greater in the surface layer larger than in the internal portion and wherein a composition gradient in which the composition ratio represented by silicon carbide/(silicon carbide+silicon nitride) increases nearly continuously from the surface layer toward the internal portion.

2. A slider member comprising a composite ceramic sintered material comprising a composition containing at least silicon carbide, silicon nitride and free carbon, wherein the silicon carbide has a three-dimensionally bonded porous texture, and the silicon nitride and free carbon fill the pores of the porous texture.

3. A slider member comprising a composite ceramic sintered material comprising a surface layer of a composition which contains silicon nitride and carbon, and an internal portion of silicon carbide or a combination of silicon carbide, silicon nitride and carbon, the content of carbon or of silicon nitride being greater in the surface layer than in the internal portion and a lubricating oil with which the sintered material is impregnated.

4. The slider member according to claim 3, wherein the composite ceramic sintered material has an open porosity of 0.1 to 5%.

5. The slider member according to claim 3, wherein the lubricating oil comprises at least one of a paraffin oil, a silicon oil, a naphthene oil and a fluorine oil.

6. The slider member according to claim 1, wherein the sintered material is impregnated with an oil in an amount of 0.01 to 1% by weight.

* * * * *